United States Patent
Viellard (10) Patent No.: US 9,944,358 B2
(45) Date of Patent: Apr. 17, 2018

(54) TRANSPORTATION AND INSTALLATION OF SUBSEA RIGID TIE-IN CONNECTIONS

(71) Applicant: Acergy France SAS, Suresnes (FR)

(72) Inventor: Brice Viellard, Boulogne-Billancourt (FR)

(73) Assignee: Acergy France SAS, Suresnes (FR)

( * ) Notice: Subject to any disclaimer, the term of this patent is extended or adjusted under 35 U.S.C. 154(b) by 0 days.

(21) Appl. No.: 15/111,788

(22) PCT Filed: Jan. 14, 2015

(86) PCT No.: PCT/IB2015/000240
§ 371 (c)(1),
(2) Date: Jul. 14, 2016

(87) PCT Pub. No.: WO2015/107421
PCT Pub. Date: Jul. 23, 2015

(65) Prior Publication Data
US 2016/0347422 A1    Dec. 1, 2016

(30) Foreign Application Priority Data

Jan. 15, 2014  (GB) .................................. 1400655.5

(51) Int. Cl.
*F16L 1/16* (2006.01)
*F16L 1/26* (2006.01)
(Continued)

(52) U.S. Cl.
CPC ............. *B63B 21/66* (2013.01); *B63B 35/44* (2013.01); *B63C 11/52* (2013.01); *B63G 8/22* (2013.01);
(Continued)

(58) Field of Classification Search
CPC ... F16L 1/161; F16L 1/20; F16L 1/207; F16L 1/24
(Continued)

(56) References Cited

U.S. PATENT DOCUMENTS 650,134 A  *  5/1900  Phillips .................. F16L 1/165
                                                29/282
2,910,835 A  *  11/1959  Timothy ................. B63B 35/03
                                                119/422
(Continued)

FOREIGN PATENT DOCUMENTS

EP    0076262       10/1982
EP    1 661 804     5/2006
(Continued)

*Primary Examiner* — Frederick L Lagman
(74) *Attorney, Agent, or Firm* — Levy & Grandinetti (57) ABSTRACT

A method of transporting a rigid tie-in connection across a body of water for installation underwater is disclosed. The method includes the step of supporting the tie-in connection in the water by buoyancy acting on a frame that supports the tie-in connection until installation. The buoyancy-supported frame is lowered and the tie-in connection into a sub-surface transit configuration. The method further includes in the transit configuration, towing the buoyancy-supported frame and the tie-in connection behind a towing vessel toward an installation site. Also disclosed is a system for implementing the method. The system includes a towable frame arranged to support the tie-in connection until installation and an external buoyancy attached to the frame by an extensible suspension link arranged to suspend the frame from the buoyancy in water in use. The link is extensible to lower the frame from a raised surface-tow configuration into a lowered sub-surface transit configuration.

36 Claims, 9 Drawing Sheets

(51) Int. Cl.
  *B63B 21/66* (2006.01)
  *F16L 1/24* (2006.01)
  *B63C 11/52* (2006.01)
  *B63G 8/22* (2006.01)
  *E21B 43/013* (2006.01)
  *B63B 35/44* (2006.01)
  *E21B 43/017* (2006.01)
  *B63G 8/42* (2006.01)

(52) U.S. Cl.
  CPC .......... *E21B 43/013* (2013.01); *E21B 43/017* (2013.01); *F16L 1/24* (2013.01); *F16L 1/26* (2013.01); *B63G 2008/425* (2013.01); *F16L 1/16* (2013.01)

(58) Field of Classification Search
  USPC .......................................................... 405/171
  See application file for complete search history.

(56) References Cited

U.S. PATENT DOCUMENTS

| | | | | |
|---|---|---|---|---|
| 3,656,309 A * | 4/1972 | Bultema | ................... | F16L 1/26 405/170 |
| 3,698,348 A | 10/1972 | Morgan | | |
| 4,011,729 A * | 3/1977 | Kermel | ................... | F16L 1/165 405/158 |
| 4,075,862 A | 2/1978 | Ames | | |
| 4,117,693 A * | 10/1978 | Fournie | ................... | F16L 1/163 405/171 |
| 4,304,505 A * | 12/1981 | Silvestri | ................... | F16L 1/26 405/170 |
| 4,326,821 A * | 4/1982 | Stefens | ................... | F16L 1/165 405/158 |
| 4,377,354 A * | 3/1983 | Morton | ................... | F16L 1/165 405/158 |
| 4,426,950 A | 1/1984 | Cholet | | |
| 4,459,065 A * | 7/1984 | Morton | ............... | E21B 43/0135 166/343 |
| 4,474,507 A | 10/1984 | Morton | | |
| 4,789,269 A * | 12/1988 | Ayers | ........................ | F16L 1/16 405/158 |
| 4,887,931 A | 12/1989 | Frisby et al. | | |
| 5,425,599 A * | 6/1995 | Hall | .......................... | F16L 1/26 405/158 |
| 5,683,204 A * | 11/1997 | Lawther | ................... | F16L 1/16 405/158 |
| 5,716,088 A | 2/1998 | Chandler et al. | | |
| 6,405,802 B1 | 6/2002 | Williams | | |
| 7,011,473 B2 | 3/2006 | Tangen et al. | | |
| 7,112,008 B2 * | 9/2006 | Sestito | ...................... | F16L 1/24 405/158 |
| 7,470,088 B2 * | 12/2008 | Baghernejad | ........... | F16L 1/163 405/168.2 |
| 7,677,623 B2 | 3/2010 | Bath | | |
| 8,141,643 B2 | 3/2012 | Fowkes | | |
| 2006/0150884 A1 | 7/2006 | Cocksedge et al. | | |
| 2008/0095583 A1* | 4/2008 | Giovannini | ............. | F16L 1/163 405/171 |
| 2009/0293792 A1* | 12/2009 | Alliot | ..................... | B63B 21/66 114/244 |

FOREIGN PATENT DOCUMENTS

| | | | |
|---|---|---|---|
| KR | 1020130098636 | 9/2013 | |
| NL | 7805984 | 12/1979 | |
| WO | WO 2010/065999 | 6/2010 | |
| WO | WO 2010086116 A1 * | 8/2010 | ............. F16L 1/163 |

* cited by examiner

TRANSPORTATION AND INSTALLATION OF SUBSEA RIGID TIE-IN CONNECTIONS

This invention relates to the transportation and installation of rigid tie-in connections, namely spools and jumpers as used in the subsea oil and gas industry.

A typical deepwater oil and gas production installation comprises numerous elements on the seabed, including satellite wells that collectively feed a common export pipeline via manifolds or other connecting elements. Other elements of a subsea installation may include PLETs, PLEMs and trees. Many of those elements have to be connected to other elements of the installation by tie-in connections.

Tie-in connections comprise pipes that carry fluids such as well fluids, injection water, injection chemicals and riser lift gas between different flowlines. Flanged interfaces at the ends of tie-in connection pipes are known but in deepwater applications, such pipes usually terminate in specialised connectors that are apt to be aligned and secured using guide wires and unmanned underwater vehicles (UUVs) such as remotely-operated vehicles (ROVs).

A tie-in connection is referred to as a spool if much of its pipe length is designed to lie horizontally on the seabed. The part of the spool that lies horizontally in use will typically have a complex shape with various bends to impart flexibility and to avoid other structures on the seabed. Conversely, a tie-in connection is referred to as a jumper if a significant part of its pipe length is designed to stand up from the seabed, usually in a vertical plane. For example, a jumper may be used to cross over other pipes such as spools previously laid on the seabed.

A tie-in connection can comprise a flexible pipe, in which case it may be installed by unspooling the pipe from a reel-lay surface vessel. However, a flexible pipe solution is costly and so is reserved for tie-in connections that are so lengthy as to make the use of rigid pipe impractical. In other words, there is a preference to use rigid pipe where possible, wherever the length of a tie-in connection and other parameters of the subsea installation allow. In this context, 'rigid' means a pipe that is largely or exclusively made of a stiff, rigid material, such as a rigid steel pipe or a composite pipe.

Those skilled in the art understand clearly the distinction between the terms 'rigid' and 'flexible', as used in relation to pipes in the offshore oil and gas industry. They also know that a rigid pipe is not devoid of flexibility. Whilst plastic deformation of rigid tie-in connections must generally be avoided both during installation and in use, elastic deformation of such connections is expected and designed for. Indeed, excessive rigidity must be avoided because tie-in connections have to accommodate movement due to environmental loading, low-strength soils, pipe-walking and thermal expansion resulting from high product temperatures. Tie-in connections also have to accommodate the tolerances of fabrication and installation.

Various interrelated design issues add complexity to rigid tie-in connections. For example, the length of a pipe and the number of flow bends may be increased to impart greater flexibility to a nominally rigid tie-in connection. The result is a heavy and awkward assembly that tends to be difficult to fabricate, to transport and to install. In this respect, rigid tie-in connections must be distinguished from straight lengths of rigid pipe, which are very much simpler to support during transportation and installation.

Rigid tie-in connections typically have a length that greatly exceeds their diameter. They are therefore particularly sensitive to bending under self-weight and to buckling at locations of high stress before being properly supported on the seabed for use. Additionally, the complex three-dimensional shapes of rigid tie-in connections respond in complex ways to loads experienced during fabrication, transportation and installation. Such loads includes dynamic excitation due to shock loadings and loads arising from thermal expansion and contraction, for example upon immersion into colder water.

To save cost, there is a desire to adopt longer rigid tie-in connections to do the job previously performed by more expensive flexible pipe solutions. However, there is a practical limit on the length of a rigid tie-in connection: that limit is defined by the difficulty of supporting a very long and complex-shaped pipe during fabrication and installation without risking uncontrolled plastic deformation. The limit is also defined by the size and lifting capacity of available installation vessels.

In practice, rigid tie-in connections must be handled using a supporting structure: they are typically suspended from a spreader bar or frame or they are carried by a support frame. Thus supported, short rigid tie-in connections can be handled by, and transported on the deck of, conventional installation vessels such as barges. However, the combination of a long rigid tie-in connection and its supporting structure represents a particularly bulky and heavy assembly.

Long tie-in connections may be 30 to 100 meters or more in length. If implemented in rigid pipe, the assembly of such a tie-in connection and its supporting structure may not fit on the deck of a typical installation vessel. The weight of the assembly may also exceed the crane capacity of available vessels. These are reasons why flexible pipe tends to be preferred for long tie-in connections, despite its high price.

U.S. Pat. No. 6,405,802 and U.S. Pat. No. 7,677,623 feature improvements of conventional spreader bars or frames for lowering a tie-in connection. They do not solve problems of transportation. Similarly, U.S. Pat. No. 5,716,088 describes a spreader frame with the same fundamental problem: longer tie-in connections require bigger frames.

When the size of a tie-in connection and its supporting structure exceeds the space available on the deck of an installation vessel, a wet-towing technique can be employed. An example is described in U.S. Pat. No. 8,141,643, in which a tie-in connection is handled and supported by a frame. When pulled from a shore fabrication site into sufficiently deep water, the frame is connected to the underside of an installation vessel that then sails to an installation site. From there, the frame is lowered to the seabed using a crane of the vessel acting through a moonpool. However, the length and buoyancy of the vessel still limit the size of the frame and therefore the length of a tie-in connection that can be installed using this technique.

In NL 7805984, a pipeline is suspended from a carrier pipe that is also used as a buoyancy reserve. A carrier pipe such as this could not provide enough buoyancy for use with a long tie-in connection and even if the carrier pipe were enlarged in an attempt to fulfil that requirement, the resulting bulky hollow spreader frame would not be a practical or efficient solution. Additionally, the ballasting provisions in NL 7805984 would be inadequate for lowering a tie-in connection to the seabed, particularly in deepwater applications.

A carrier buoy is used in seismic surveys, where sensors are suspended from buoys as in EP 0076262. However, such sensors are small items that bear no relationship to the challenges of supporting and transporting a long rigid tie-in connection in a manner that facilitates its subsequent installation on the seabed.

Mixing the functions of buoyancy and a spreader frame is challenging. This is demonstrated by U.S. Pat. No. 4,426,950, which tries to achieve this goal but is relevant only for small items such as surveying apparatus, to be held at a constant water depth.

U.S. Pat. No. 7,011,473 describes a rigging arrangement with a tri-plate, which is designed to facilitate transferring the load from a buoy to a winch of an installation vessel, used for towing and lowering. This arrangement would not be suitable for the installation of a tie-in connection, for which an additional spreader bar would still be required. Instead, a pulling force is exerted on the buoyancy wire or on the load. Also, the buoy remains at the surface: this requires long variable-length wires, which is not practically manageable in offshore environments commonly encountered today.

U.S. Pat. No. 3,698,348 and U.S. Pat. No. 4,474,507 describe securing a pipeline bundle within a pipe-like support structure so as to form a single transportation structure. This transportation structure is then transported to an installation site and deployed for use. The pipe-like support structure thus does not form a frame for supporting the pipeline bundle but moreover forms an integral part of the bundle and it is thus not possible to remove the pipe support after installation. With specific reference to U.S. Pat. No. 4,474,507, the pipe-like support structure is towed by opposing sled assemblies which support the pipe-like support structure at each end. These sled assemblies would not be suitable for supporting a tie-in connection during towing since tie-in connections typically have a more irregular shape than a pipe bundle. Specifically, the tie-in connection would require support at more places than just two extremities in order to minimise the risk of buckling and other plastic deformation of the tie-in connection.

Similarly, U.S. Pat. No. 4,075,862 describes the use of vehicles at opposing ends of a pipeline for lowering and raising the pipeline at an installation location. These vehicles are stored on opposing towing vessels during transit to the installation location, where the main length of the pipe is supported by external floats attached to the pipe by a link of fixed length. It would not be possible to tow a tie-in connection at opposing ends and drag it through the water during transit without damaging it. In addition, raising and lowering a tie-in connection using these vehicles would also risk plastic deformation of the tie-in connection since the vehicles are only supported at two specific ends points leaving the majority of it un supported.

US 2006/0150884 describes towing a pipe through a body of water using a towing vessel. The pipe is not directly towed by the vessel but instead, the pipe is towed using a tow cable. The cable may be routed through the interior of the pipe, which pipe is suspended therefrom. Some embodiments describe the use of external floats attached to the pipe directly to suspend the pipe therefrom whilst immersed.

U.S. Pat. No. 4,887,931 describes towing a pipe to an installation location. The pipe is coupled directly to a towing cable by a plug situated within an end of the pipe. Both ends of the pipe are fitted with plugs to form water tight seals. An internal pig is used to increase or decrease the internal buoyancy of the pipe by changing the water/air ratio within the pipe.

KR 1020130098636 describes a method of S-laying a pipe by employing a buoy to replace the stinger of a lay barge. The buoy has a roller box suspended from it by a flexible link, which flexible link is coupled to the roller box by a pin. With the link slack, the pin is engaged in the roller box which holds the pipe firm preventing axial movement of the pipe. When the pipe is lowered and the flexible link becomes taut, the pin releases and the roller box splays outwardly releasing its grip on the pipe allowing the pipe to roll axially on the rollers. When the link is taut, the buoy is not suitable for transporting the pipe to an installation location since the pipe is not held firm by the roller box. In addition, these buoys only support discrete points along the length of the pipe which is not suitable for dragging a tie-in connection through the water during to its complex shape.

It is against this background that the present invention has been devised. The invention mitigates the drawbacks outlined above by proposing an arrangement and method to transport and install substantially rigid spools and jumpers for subsea installation, where the spools or jumpers may be longer than the free deck space of conventional vessels.

The invention decouples a transport and installation system for a rigid tie-in connection from surface vessel architecture, needing only bollard pull from a towing vessel. The invention also prefers splitting the functions of buoyancy and a spreader or support frame.

Preferred embodiments of the invention involve wire arrangements that are different to those of known carrier buoy or carrier pipe solutions, especially wires with variable or adjustable length between the spreader or support frame and a supporting buoy. In some embodiments, the buoy can be lowered under the surface to the seabed and so is of incompressible material to withstand great hydrostatic pressure.

The inventive concept allows the installation of spools or jumpers of significant size by towing them from shore or a construction site for deployment subsea on site. A spool or jumper may be lifted directly from a quayside with the support of a frame and then the assembly is towed on the surface from shallow water towards deeper water. There, the assembly is lowered subsurface before being towed to the installation site, where the spool or jumper is lowered on target and installed as part of a subsea installation.

The specific description that follows describes preferred towing arrangements, specific rigging arrangements and the phased sequence of deployment. Briefly, the invention employs a specialised spreader or support frame that is designed to be towed from shore to an offshore site. The frame has a ballasting system or releasable buoyancies attached. A spool or jumper is fabricated in a yard and the frame is installed on top of spool or jumper with subsea deployment rigging connected. The resulting assembly is brought from the assembly location to a quayside where the assembly is lifted directly into the water. Then, a towing vessel connects itself to a towing bridle connected to the frame. Either a buoy or the frame is pulled by the towing vessel, meaning that a pulling force is exerted on the intermediate frame or on the buoy.

Thus, from one aspect, the invention resides in a method of transporting a rigid tie-in connection across a body of water for installation underwater. The method of the invention comprises: supporting the tie-in connection in the water by buoyancy acting on a frame that supports the tie-in connection until installation; lowering the buoyancy-supported frame and the tie-in connection into a sub-surface transit configuration; and in the transit configuration, towing the buoyancy-supported frame and the tie-in connection behind a towing vessel toward an installation site. When towing, bollard pull may be applied by a towing vessel simply to the frame or to external buoyancy attached to the frame.

The frame is preferably an open structure, such as a lattice or the like, that supports and releases the rigid tie-in connection, before and after transit under water. The frame is preferably dimensioned and configured to support a majority of the tie-in connection.

There can be relative movement between the tie-in connection and the frame and/or buoyancy during or after installation.

Preferably, the buoyancy-supported frame and the tie-in connection are towed together behind the towing vessel in a raised surface-tow configuration before the frame and the tie-in connection are lowered into the transit configuration for further towing toward the installation site. In the surface-tow configuration, the combination of the frame and the tie-in connection may be supported at least partially by external buoyancy, in which case an extensible link between the frame and the external buoyancy may be held shortened. The combination of the frame and the tie-in connection, and any external buoyancy for supporting that combination, may be lifted into the water in the surface-tow configuration before being towed by the towing vessel.

In the surface-tow configuration, the combination of the frame and the tie-in connection may have positive buoyancy in the water to minimise the draft of the combination. In this way, the combination of the frame and the tie-in connection may form a positively buoyant element in the water. For example, positive buoyancy may be imparted to the frame by on-board buoyancy that comprises air in a ballast compartment of the frame or at least one buoyancy unit attached to the frame. However, it is possible instead for the combination of the frame and the tie-in connection to have negative buoyancy in the water and therefore to require the support of external buoyancy, namely a positively buoyant element.

Negative buoyancy, positive buoyancy and neutral buoyancy are readily understood terms of art. However, for the avoidance of doubt the following definitions are provided. Negative buoyancy is understood to mean an immersed object tending to sink, or descend through a body of water due to a resultant force acting on it, which resultant force has an downwards direction. The resultant force having a downwards direction is primarily due to the immersed object having a higher average density than the surrounding body of water. Neutral buoyancy on the other hand is characterised by an immersed object maintaining a substantially constant depth within a body of water due to resultant force acting on it being balanced in upwards and downwards directions. A zero resultant force primarily results from the immersed object having an average density substantially equal to the surround body of water. In contrast, positive buoyancy is understood to mean an immersed object tending to ascend through a body of water due to a resultant force acting on it, which resultant force has an upwards direction. The upwards resultant force is primarily due to the immersed object having relatively low density, on average, compared to the surrounding body of water. Accordingly, whether an immersed object has positive, neutral, or negative buoyancy is governed primarily by the object's relative density compared to the body of water in which it is immersed.

When lowering the frame and the tie-in connection into the transit configuration, a link may be lengthened between the frame and external buoyancy from which the frame is suspended. Thus, in the transit configuration, the external buoyancy can remain at the surface of the water.

The frame may be supported at least partially by on-board buoyancy, in which case the on-board buoyancy of the frame may be reduced when lowering the frame and the tie-in connection into the transit configuration. For example, on-board buoyancy of the frame can be reduced by flooding a compartment of the frame or by detaching at least one buoyancy unit from the frame.

At the installation site, the frame and the tie-in connection are suitably suspended from an installation vessel and lowered with negative buoyancy to a seabed location, preferably starting from a sub-surface depth like that of the transit configuration. Again, on-board buoyancy of the frame can be reduced if necessary by flooding a compartment of the frame or by detaching at least one buoyancy unit from the frame before lowering the frame and the tie-in connection to the seabed location. Any floodable compartment of the frame is preferably flooded fully to remove the possibility of collapse under hydrostatic pressure at depth.

External buoyancy may be detached from the frame before the frame and the tie-in connection are lowered to the seabed location. Advantageously, however, the frame and the tie-in connection may be lowered to the seabed location with external buoyancy remaining attached to the frame. The combination of the frame, the tie-in connection and the external buoyancy will then have negative buoyancy on aggregate; also, when the tie-in connection is released from the frame at the seabed location, the combination of the frame and the external buoyancy will still have negative buoyancy on aggregate to allow a controlled lift to the surface. Nevertheless, the external buoyancy will beneficially reduce the apparent weight supported by a crane or winch of the installation vessel throughout.

After the tie-in connection is released from the frame at the seabed location, the installation vessel raises the frame to or near the surface. There, positive buoyancy is suitably re-established for towing the frame subsequently back to shore, either by increasing on-board buoyancy of the frame or by attaching external buoyancy to the frame. Where the frame is supported by external buoyancy, an extensible link between the frame and the external buoyancy may be held lengthened to hold the frame below the external buoyancy in a sub-surface transit configuration in which the frame is towed behind a towing vessel. However, the extensible link between the frame and the external buoyancy may be shortened to lift the frame into a surface-tow configuration instead.

The inventive concept also embraces a system for transporting a rigid tie-in connection across a body of water for installation underwater. The system of the invention comprises: a towable frame arranged to support the tie-in connection until installation; and external buoyancy attached to the frame by an extensible suspension link arranged to suspend the frame from the buoyancy in water in use, the link being extensible to lower the frame from a raised surface-tow configuration into a lowered sub-surface transit configuration. Towing rigging may be attached to the frame or to the external buoyancy for the application of bollard pull by a towing vessel.

Isolating or damping devices may act between the frame and the tie-in connection or between the frame and the external buoyancy. In this way, wave-driven movement of the external buoyancy is advantageously isolated or damped to reduce excitation of the frame and/or the tie-in connection.

The frame preferably further comprises an on-board ballasting system, which may comprise at least one floodable ballast compartment and/or at least one buoyancy unit releasably attached to the frame. External buoyancy may be releasably attached or permanently attached to the frame. To allow permanent attachment to the frame in deepwater applications, the external buoyancy suitably comprises at least one substantially incompressible buoyant body.

Where a rigid tie-in connection is supported by the frame, the combination of the frame and the tie-in connection may be arranged to have positive buoyancy in the water. Alternatively, the combination of the frame and the tie-in connection may be arranged to have negative buoyancy in the water and to be supported by the external buoyancy. In that latter case, buoyancy of the frame may be adjustable between: a transit state in which the negative buoyancy of the combination is exceeded by positive buoyancy of the external buoyancy; and an installation state in which the negative buoyancy of the combination exceeds the positive buoyancy of the external buoyancy.

In order that the invention may be more readily understood, reference will now be made, by way of example, to the accompanying drawings, in which.

FIGS. 1a to 5 of the drawings show a first embodiment of the invention. In this embodiment, a spool 10 is shown suspended from a spreader frame 12 by wires 14. The spreader frame 12 is designed to be towed with the spool 10 suspended beneath it from shore to an offshore installation site.

The shape of the spool 10 will vary between applications but some of its typical complexity is evident in these drawings. In practice, the bends of the spool 10 may be more complex and will usually extend into three dimensions. For example, whilst much of the length of the spool 10 is in a plane that will lie against the seabed in use, parts of the spool 10 will generally lie outside that plane to stand up from the seabed.

The spool 10 is fabricated at a site on land near the shore, such as a dockyard. There, the spreader frame 12 is installed on top of the spool 10 with all necessary rigging connected to the spreader frame 12, including subsea deployment rigging as will be explained below. The spreader frame 12, or an additional frame or jig, may also be used to support the spool 10 during fabrication.

The spool 10 and the spreader frame 12 are transported together from the fabrication site to a quay. Of course, this transportation step may advantageously be omitted if it is possible to fabricate the spool 10 and to unite it with the spreader frame 12 on the quay itself.

Figure 1A:
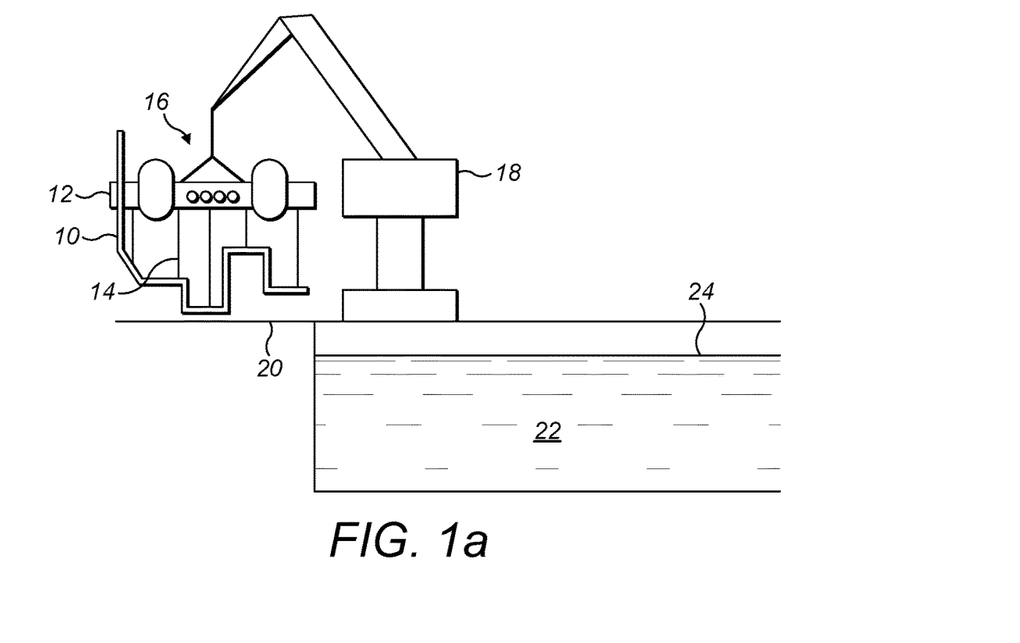
FIG. 1a is a schematic side view of a rigid tie-in connection, exemplified here as a spool, suspended below a spreader frame at a quayside.
Figure 1B:
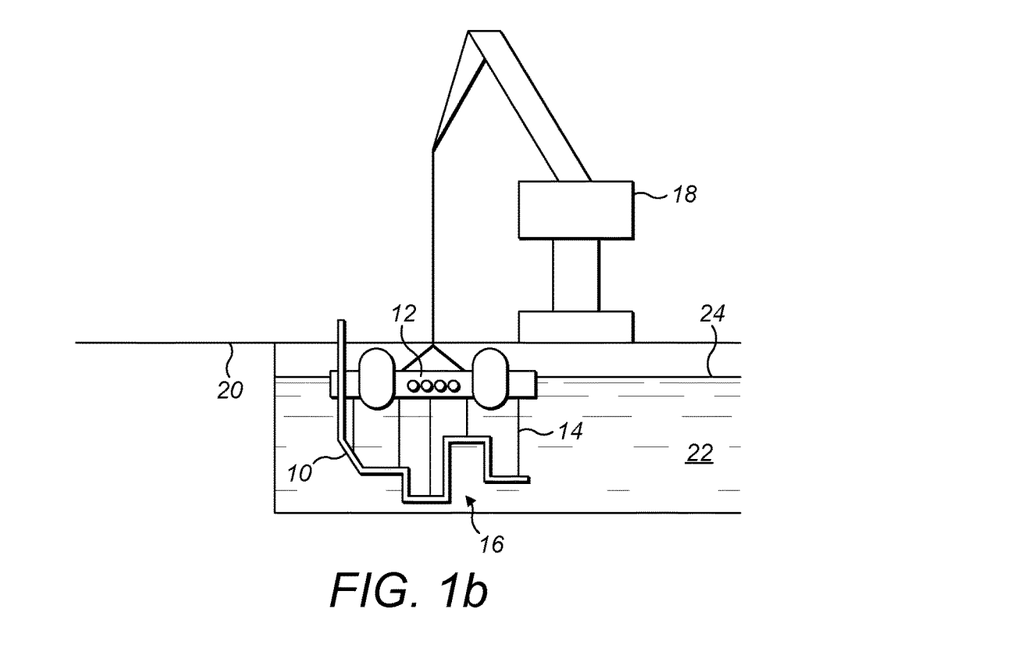
FIG. 1b corresponds to FIG. 1a but shows the assembly of the spool and the spreader frame being lifted by a crane from the quayside into an adjacent body of water.

FIGS. 1a and 1b show the assembly 16 of the spool 10 and the spreader frame 12 being lifted by a crane 18 directly from a quay 20 into an adjacent body of water 22, where the assembly 16 floats at the surface 24 due to buoyancy provided in, or on, the spreader frame 12. Specifically, the spreader frame 12 has an on-board ballasting system 26 shown schematically in FIG. 3 and/or has external buoyancy attached.

In this example, to show various buoyancy options, the spreader frame 12 has an on-board ballasting system 26 supplemented by auxiliary on-board buoyancy units 28 attached temporarily to the exterior of the spreader frame 12. Additionally, external deep-water buoys 30 are attached permanently to the spreader frame 12 by variable-length links exemplified by wire rigging 32. The length of the rigging 32 may, for example, be varied by activating submersible winches (not shown) mounted on the buoys 30 or the spreader frame 12 to reel in or pay out rigging wire or chain.

Figure 2:
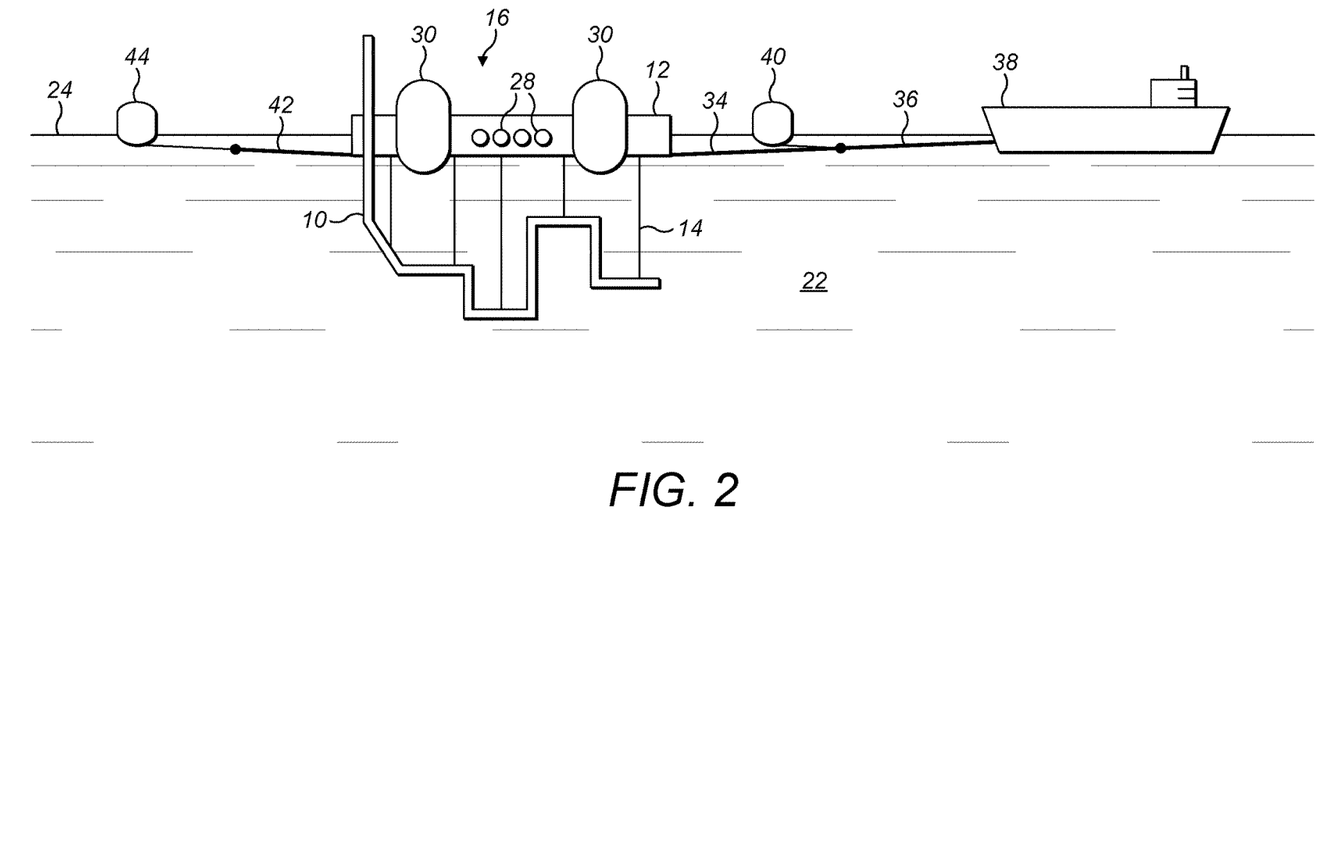
FIG. 2 is a schematic side view of the spool and the spreader frame while being towed by a surface vessel in a near-shore surface-tow configuration in accordance with the invention.
Figure 3:
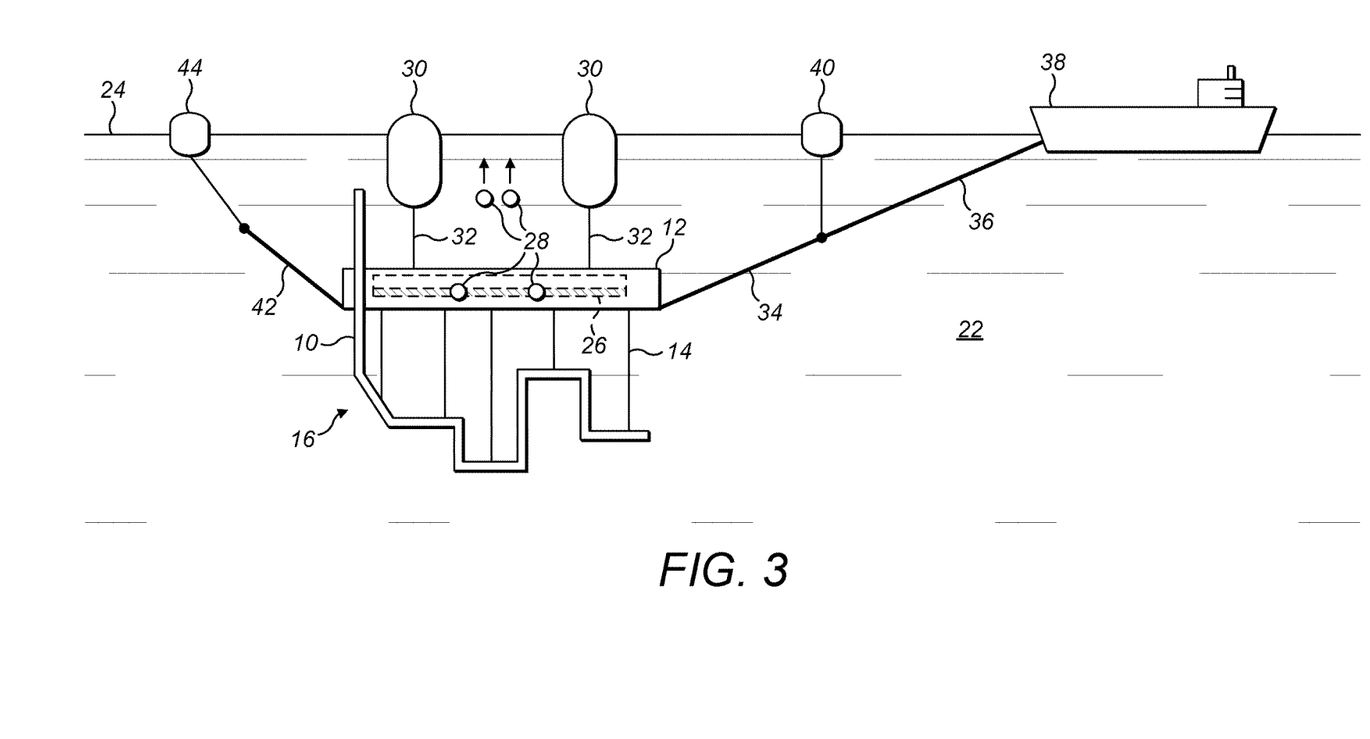
FIG. 3 corresponds to FIG. 2 but shows the spreader frame and the spool lowered below the surface in an offshore transit configuration in accordance with the invention, while still being towed by a surface vessel toward an installation site.

In these simplified views, the rigging 32 is hidden when in a shortened surface-tow configuration as shown in FIG. 2 but is visible when lengthened into a transit configuration as shown in FIG. 3.

When the rigging 32 is in the shortened surface-tow configuration of FIG. 2, the buoys 30 are held close to the spreader frame 12 and lie at a similar horizontal level to the spreader frame 12. The buoyant upthrust of the buoys 30 adds to the buoyant upthrust of the spreader frame 12, which at this stage is also positively buoyant by virtue of air held in the on-board ballasting system 26 and the contribution of the auxiliary buoyancy units 28.

The aggregate buoyancy of the on-board ballasting system 26, the auxiliary buoyancy units 28 and the buoys 30 is such as to lift much of the spreader frame 12 above the surface 24, which ensures clearance under the suspended spool 10 in the relatively shallow water 22 beside the quay 20. As FIGS. 1b and 2 show, it is also possible for part of the spool 10 to be held clear of the water 22, protruding above the surface 24, so as to minimise the draft of the assembly 16 at this stage.

A main towing bridle 34 is pivotally attached to a forward end of the spreader frame 12 for the purpose of towing the assembly 16 away from the quay 20 and out to a deepwater installation site. The towing bridle 34 is coupled to a flexible towing link such as a main towing wire 36 that trails from a towing vessel 38 such as a tug. A forward security buoy 40 is attached to the forward end of the towing bridle 34.

An emergency towing bridle 42 is pivotally attached to an aft end of the spreader frame 12. An aft security buoy 44 is attached to the aft end of the emergency towing bridle 42.

The security buoys 40, 44 ensure that the assembly 16 of the spool 10 and the spreader frame 12 cannot be lost due to inadvertent loss of buoyancy acting on the spreader frame 12, such as by accidental flooding of the ballasting system 26 or accidental detachment of the auxiliary buoyancy units 28 or the buoys 30.

Any of the auxiliary buoyancy units 28, the buoys 30, and the towing bridles 34, 42 with their security buoys 40, 44 may be attached to the spreader frame 12 either before or after the assembly 16 is lowered into the water beside the quay 20. In the latter case, at least the elements that contribute buoyancy must be attached to the spreader frame 12 while the apparent weight of the assembly is supported by the crane 18.

In the surface-tow configuration shown in FIG. 2, the assembly 16 of the spool 10 and the spreader frame 12 can be towed away from the quay 20 and out to sea while still in shallow and relatively calm and sheltered water 22, for example with a depth of less than thirty meters.

Once in a sufficient depth of water, for example greater than thirty meters, the assembly 16 of the spool 10 and the spreader frame 12 is lowered into a transit configuration by reducing the buoyancy of the assembly 16 as shown in FIG. 3. At the same time, as FIG. 3 also shows, the rigging 32 between the buoys 30 and the spreader frame 12 is lengthened to allow the assembly 16 to sink relative to the buoys 30. Now, therefore, the assembly 16 of the spool 10 and the spreader frame 12 becomes negatively buoyant whereas the combination of the assembly 16 and the attached buoyancy units 28 and buoys 30 is, on aggregate, positively buoyant so that the buoys 30 continue to break the surface 24.

The reduction of buoyancy of the assembly 16 may be achieved by partially flooding the on-board ballasting system 26 of the spreader frame 12 and/or by releasing some of the auxiliary buoyancy units 28 from the spreader frame 12. Both possibilities are shown in FIG. 3. Release of the auxiliary buoyancy units 28 from the spreader frame 12 can be achieved by remote control, by a UUV or by divers.

The buoys 30 continue to break the surface 24 but they sink deeper in the water at this stage as they bear a greater proportion of the weight of the assembly 16. Thus, in this example, some of the lowering of the assembly 16 is due to lengthening the rigging 32; the remainder is due to increasing the apparent weight carried by the buoys 30.

The assembly 16 is lowered to a depth at which the spool 10 and the spreader frame 12 will not suffer adverse effects from surface waves during transit to an installation site. A depth of ten to twenty meters for the spreader frame 12 may be considered sufficient for this purpose; however, this exemplary depth range is not limiting as it will depend upon the sea conditions and the sensitivity of the spool 10 and the spreader frame 12 to those conditions.

The spreader frame 12 must be designed to withstand hydrostatic pressure beyond its operational depth when in the transit configuration. Thus, in this example, any sealed tubes or compartments of the spreader frame 12 must resist collapse to a water depth in excess of twenty meters.

Sealed tubes or compartments of the spreader frame 12 may be equipped with pressure-release valves set at an absolute pressure of 3 bar corresponding to a transit depth of up to twenty meters. Such valves ensure flooding and hence protect against collapse when the spreader frame 12 is lowered to a depth below the transit depth after arrival at an installation site.

Figure 4:
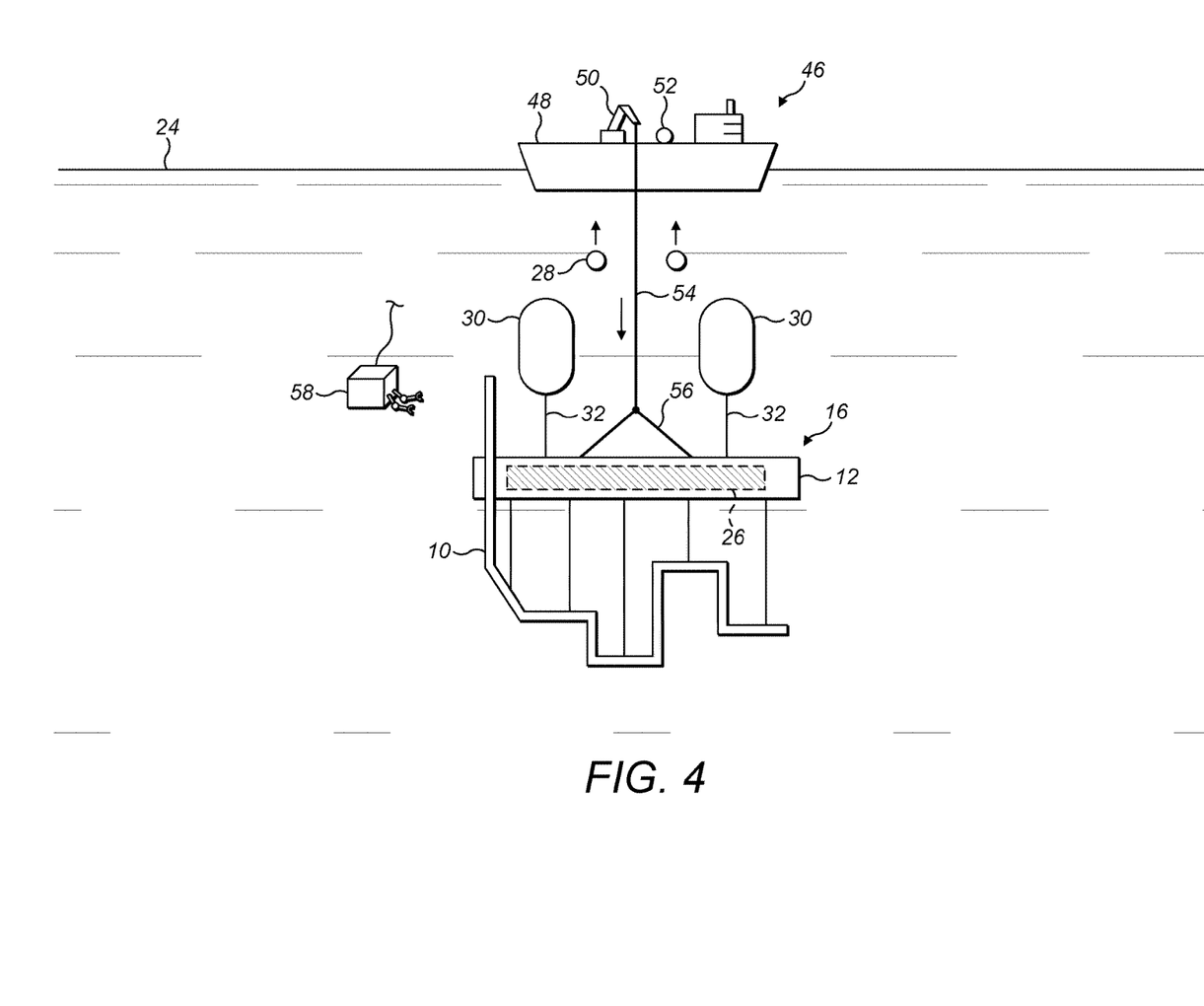
FIG. 4 corresponds to FIG. 3 but shows the spreader frame and the spool at the installation site, being lowered by a surface vessel toward the seabed during installation.

Once stabilised in the transit configuration shown in FIG. 3, the assembly 16 of the spool 10 and the spreader frame 12 is towed to an installation site as shown in FIG. 4. Here, the assembly 16 is transferred to a lowering system 46, in this instance an installation vessel 48 equipped with a crane 50 or an abandonment-and-recovery (A&R) winch 52. The towing bridle 34 and the emergency towing bridle 42 may then be disconnected from the spreader frame 12 with their associated security buoys 40, 44.

The assembly 16 is suspended from a wire 54 of the crane 50 or the winch 52 using a second rigging set 56 that is preferably pre-installed on the spreader frame 12, and is then lowered to the seabed after the load has been taken by the wire 54. For this purpose, a further reduction of buoyancy may be achieved by fully flooding the on-board ballasting system 26 of the spreader frame 12 and/or by releasing more of the auxiliary buoyancy units 28 from the spreader frame 12. Again, both possibilities are shown in FIG. 4, although it is noted that complete flooding of the on-board ballasting system 26 is advantageous and indeed may be necessary to deal with hydrostatic pressure in deepwater applications.

Disconnection of the towing bridle 34 and the emergency towing bridle 42 and release of the auxiliary buoyancy units 28 from the spreader frame 12 can be achieved by remote control, by a UUV or by divers at the installation site. A UUV or divers can also effect connection of the lowering wire 54 to the rigging set 56. An ROV 58 is shown in FIG. 4 as an example of a UUV.

As FIG. 4 shows, the buoys 30 are pulled underwater by the descending spreader frame 12. The buoys 30 remain attached to the spreader frame 12 during its journey to the seabed, beneficially reducing the apparent weight of the assembly 16 of the spool 10 and the spreader frame 12. Consequently, for deepwater applications, the buoys 30 are made of an incompressible material such as syntactic foam to resist collapse under hydrostatic pressure.

Figure 5:
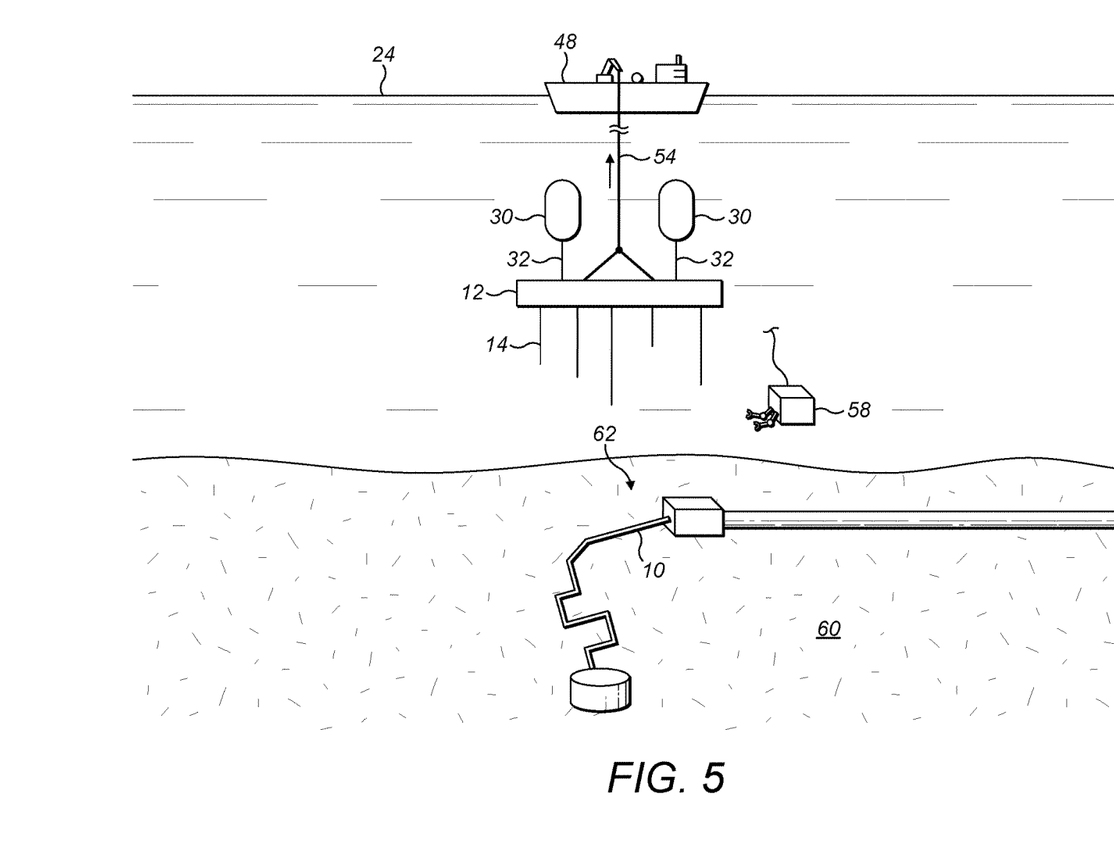
FIG. 5 corresponds to FIG. 4 but shows the spool laid on the seabed at the installation site and the spreader frame now being lifted by the surface vessel back toward the surface for recovery.

Reference is now made to FIG. 5. Upon nearing the seabed 60, the spool 10 can be maneuvered into the desired position and connected into a subsea installation 62 with the assistance of UUV intervention, again exemplified here by an ROV 58. Other conventional guide systems can be used if required. Divers could be employed instead of a UUV if the water is shallow enough.

The spreader frame 12 can then be released from the spool 10 by remote control or by UUV or diver intervention, to be recovered to the surface 24 for re-use. FIG. 5 shows the spreader frame 12 starting its journey to the surface 24 after installation of the spool 10, being pulled back toward the installation vessel 48 by the wire 54 acting via the rigging set 56.

Whilst, on aggregate, the combination of the buoys 30 and the spreader frame 12 must have negative buoyancy at this stage to ensure a controlled lift to the surface 24, the buoys 30 can remain attached to the spreader frame 12 throughout to reduce its apparent weight. The rigging 32 between the buoys 30 and the spreader frame 12 remains in the lengthened transit configuration at this stage.

When the spreader frame 12 has been pulled close to the surface 24, buoyancy is re-established to the extent that the spreader frame 12 no longer requires support from the wire 54 of the installation vessel 48. For this purpose, air may be pumped back into the on-board ballasting system 26 of the spreader frame 12 and/or additional buoys or buoyancy units may be attached the spreader frame 12. The towing bridle 34 and the emergency towing bridle 42 with their associated security buoys 40, 44 may then be reconnected to the spreader frame 12. These various operations can be performed with the assistance of a UUV or divers where necessary. The installation vessel 48 or a towing vessel 38 can then tow the spreader frame 12 back to shore for re-use.

There is no longer a need to protect the fragile spool 10 on the return journey to shore. However, it may be advantageous to adopt a transit configuration like that shown in FIG. 3 while the water is deep enough, as this allows the spreader frame 12 to remain below the influence of damaging wave action. The buoyancy of the spreader frame 12 may be adjusted accordingly, for example by only partially purging water from the on-board ballasting system 26 of the spreader frame 12. This is to ensure that the spreader frame 12 itself remains negatively buoyant whereas the combination of the spreader frame 12 and attached buoys 30 or any auxiliary buoyancy units is, on aggregate, positively buoyant so that the buoys 30 again break the surface 24.

A surface-tow configuration like that shown in FIG. 2 may be adopted if the return journey encounters water that is too shallow to maintain the transit configuration. A surface-tow configuration may also be adopted if good sea conditions permit a surface tow of the spreader frame 12 all the way from the installation site back to shore. In this case, the buoyancy of the spreader frame 12 is maximised, for example by purging all water from the on-board ballasting system 26, and the rigging 32 is shortened to pull together the spreader frame 12 and the buoys 30 at the surface 24.

Figure 6:
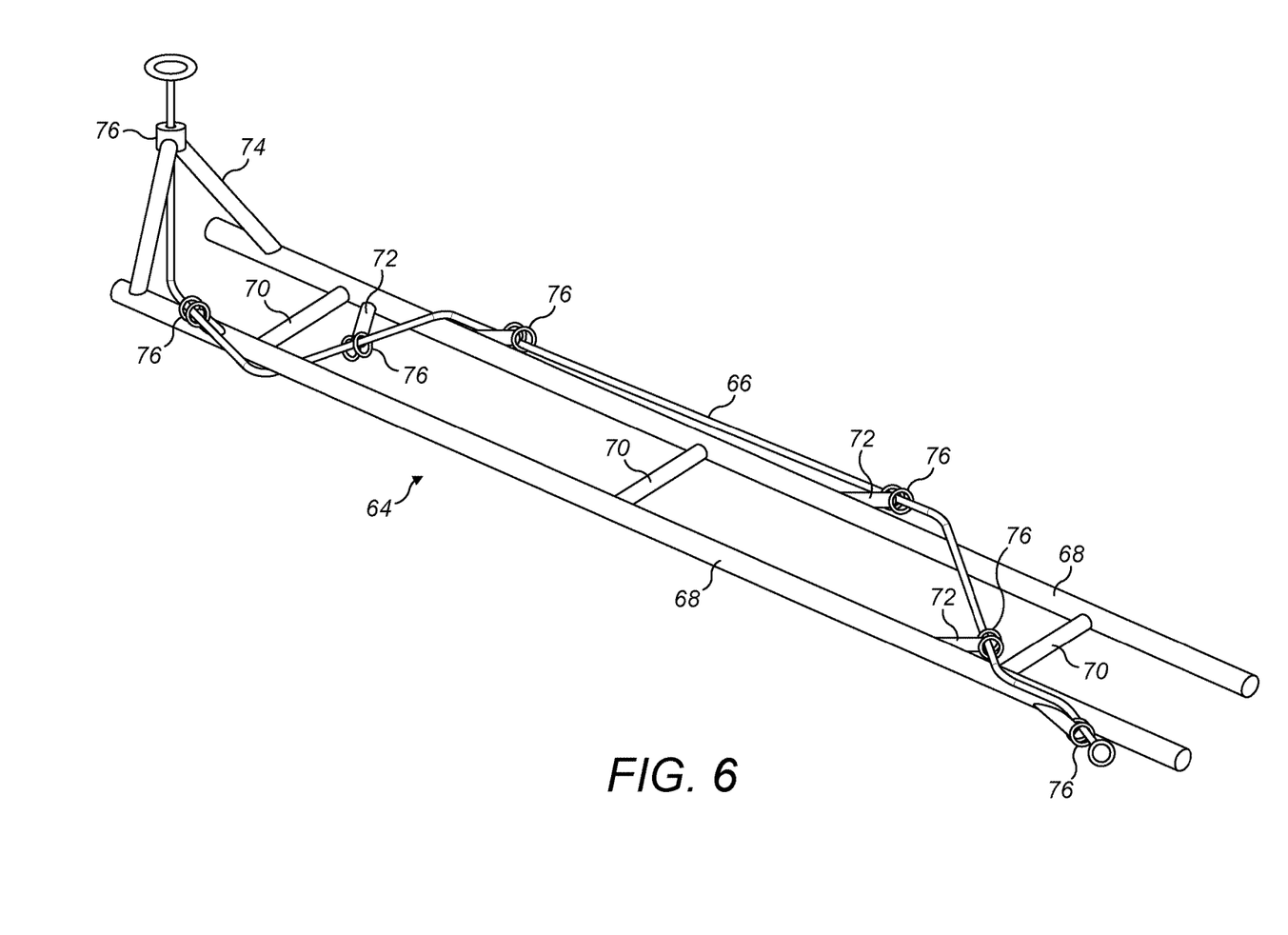
FIG. 6 is a schematic perspective view of a spool held rigidly by a support frame in another embodiment of the invention.
Figure 7:
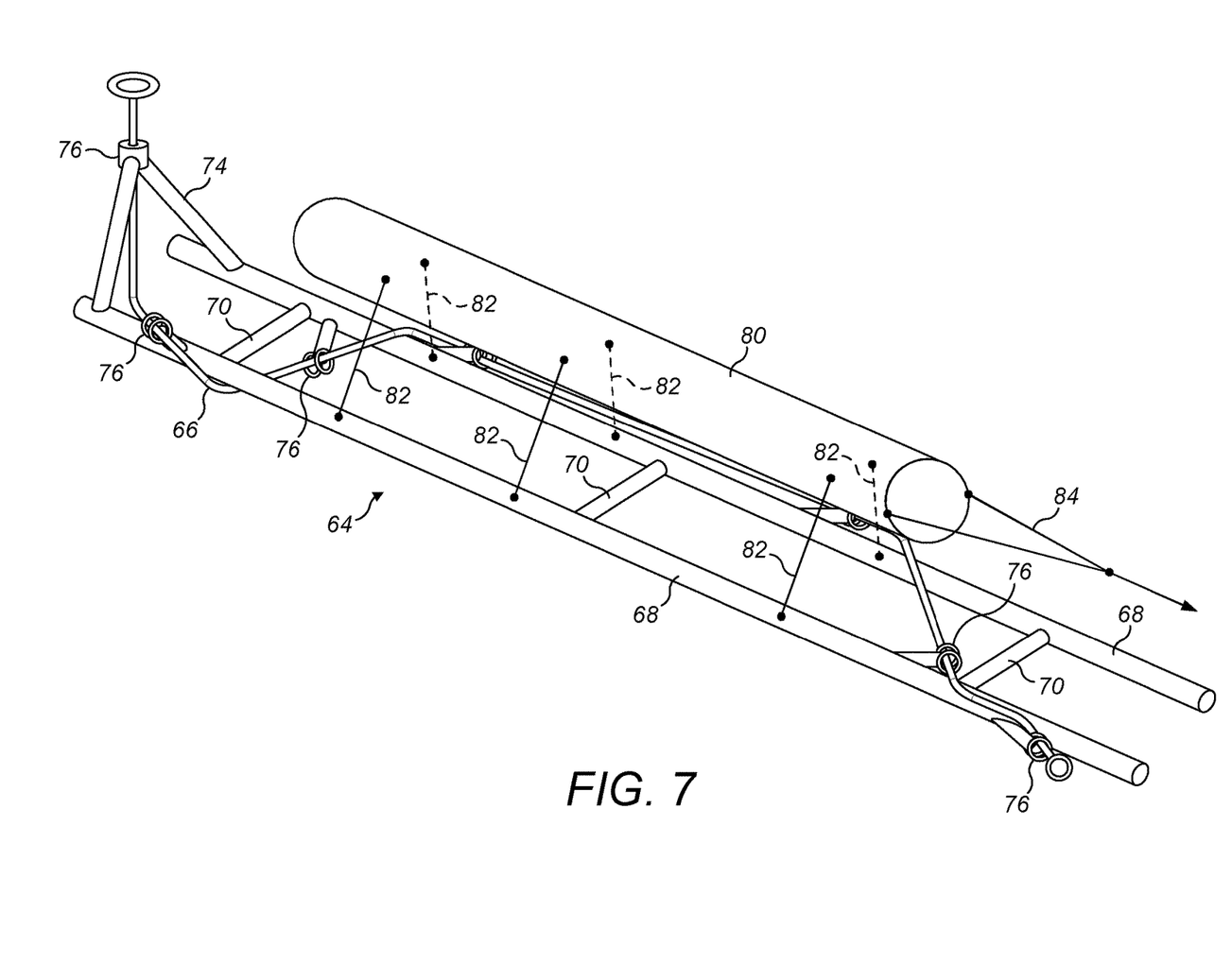
FIG. 7 corresponds to FIG. 6 but shows the frame suspended from a buoyancy unit and rigged in a surface-tow configuration.
Figure 8:
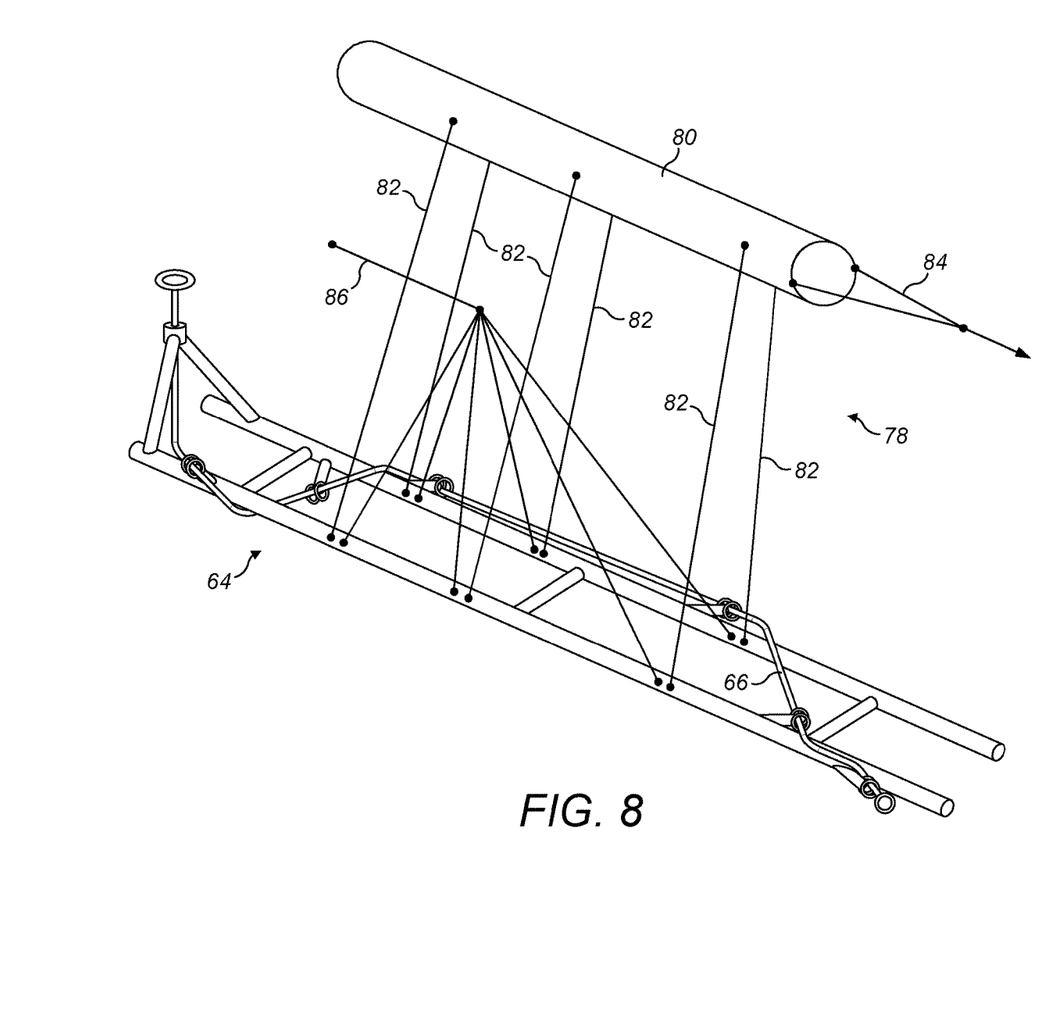
FIG. 8 corresponds to FIG. 7 but shows rigging between the buoyancy unit and the frame lengthened into a transit configuration, and also shows rigging for subsequently lowering the frame and the spool toward the seabed during installation.

Turning now to the second embodiment shown in FIGS. 6 to 8, these drawings show how a rigid support frame 64 can be used as a strengthening or rigidifying structure to control vibration of, and fatigue to, a rigid tie-in connection under shock loadings during towing. As an alternative to rigging, clamping is used in this example to connect the frame 64 rigidly to a spool 66, although some compliance must be designed into the system. The complex 3D shape of the spool 66 is evident in these drawings.

In essence, the frame 64 is an elongate ladder structure that is slightly longer than the spool 66. The ladder structure of the frame 64 comprises a pair of parallel longitudinal beams 68 joined at intervals by cross-members 70. Rigid arms 72 project at various orientations from the beams 68, which are also joined by an upstanding A-frame 74 at one end of the frame 64.

The arms 72 and the A-frame 74 terminate in respective clamps 76 that are positioned and oriented by the arms 72 to embrace and grip the spool 66 at multiple locations along its length. The clamps 76 are releasable underwater to free the spool 66 from the frame 64 upon installation subsea and can be operated by remote control or by divers or UUVs as appropriate.

As in the first embodiment, the frame 64 is installed onshore on top of the spool 66. The frame 64 could have an on-board ballasting system but in this example the frame 64 does not have on-board buoyancy, relying instead entirely upon external buoyancy. Thus, FIGS. 7 and 8 show the frame 64 suspended by extensible rigging 78 from a cylindrical buoyancy unit 80 that serves as a floater or surface buoy. The rigging 78 comprises upwardly-converging pairs of wires 82 spaced at intervals along the beams 68 and the buoyancy unit 80.

FIG. 7 shows the rigging 78 between the buoyancy unit 80 and the frame 64 in a shortened surface-tow configuration to be used beside a quay and in shallow water. Conversely, FIG. 8 shows the rigging 78 lengthened into a transit configuration to be used in deeper water.

FIGS. 7 and 8 show a main towing bridle 84 attached to a forward end of the buoyancy unit 80. An emergency towing bridle like that of the first embodiment may be attached to an aft end of the buoyancy unit 80 but has been omitted from this simplified view. FIG. 8 also shows lowering rigging 86 for lowering the frame 64 and the spool 66 subsequently toward the seabed at an installation site. The lowering rigging 86 is pre-installed on the frame 64 but is omitted from FIG. 7 for clarity.

At the installation site, the assembly of the buoyancy unit 80, frame 64 and spool 66 is towed to an installation vessel, if different from the towing vessel. A wire from a crane or A&R winch of the installation vessel is then attached to the lowering rigging 86 on the frame 64. Any clashing rigging 78 between the buoyancy unit 80 and the frame 64 may be removed as necessary.

Once the load is taken by the wire from the crane or the A&R winch of the installation vessel, the frame 64 is released from the buoyancy unit 80 and the spool 66 is deployed to target with the continuing support of the frame 64 until installation is complete. The frame 64 is then detached from the spool 66 by releasing the clamps 76, to be lifted back to the surface. A buoyancy unit 80 can be reattached to the frame 64 near the surface to support the frame 64 for towing back to shore for re-use. Again, a transit configuration or a surface-tow configuration may be chosen by adjusting the length of the rigging 78 as appropriate.

To minimise its apparent weight, it would be possible for at least one permanent buoyancy unit of incompressible material to remain attached to the frame 64 throughout its journey to and from the seabed. In that case, as in the first embodiment, one or more auxiliary buoyancy units could be removed from the frame 64 near the surface, to impart negative buoyancy to the assembly of the permanent buoyancy unit, the frame 64 and spool 66.

Figure 9:
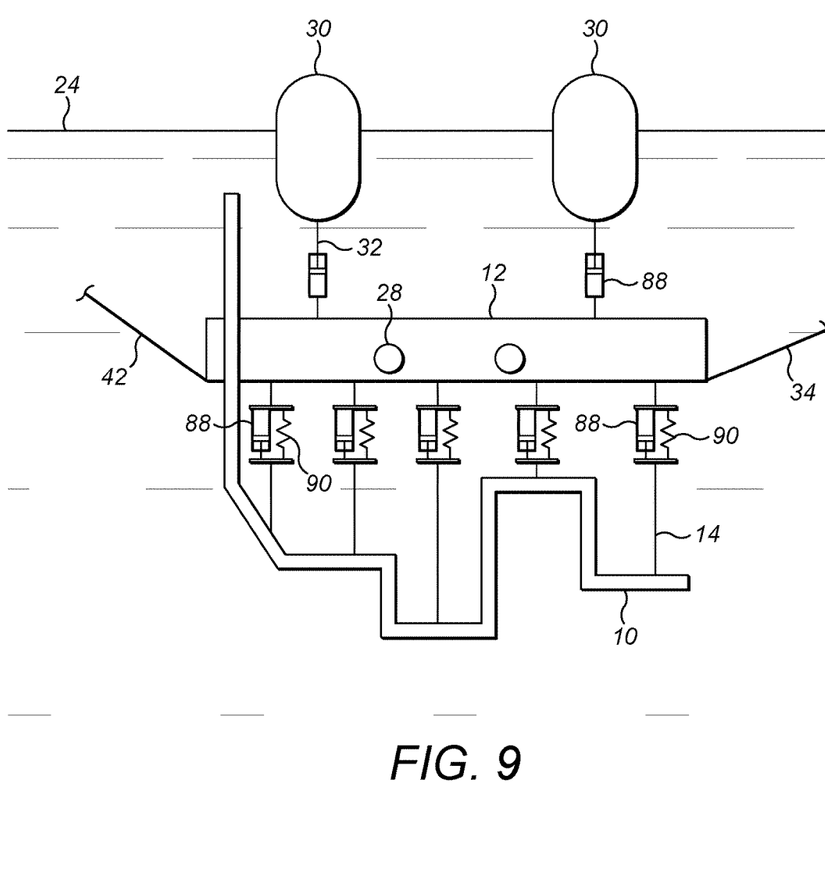
FIG. 9 corresponds to FIG. 3 but shows an enlarged view of the spreader frame and the spool in the transit configuration, with damper devices interposed in rigging between support buoys and the spreader frame and in suspension wires between the spreader frame and the spool.

Turning finally to FIG. 9, this corresponds to FIG. 3 and like numerals are used for like parts. FIG. 9 shows one of various possibilities for filtering or isolation to limit excitation of a frame and/or a tie-in connection due to movement of support buoys exposed to the effect of surface waves. For this purpose, filtering or isolating apparatus may be introduced between buoys 30 and a frame, such as the spreader frame 12 shown here, and/or between the frame 12 and a tie-in connection, such as the spool 66 shown here.

In this example of filtering or isolating apparatus, damper devices 88 or shock absorbers are interposed in rigging 32 between the buoys 30 and the spreader frame 12 and in suspension wires 14 between the spreader frame 12 and the spool 10. Resilient inserts such as springs 90 or lengths of nylon rope may additionally or alternatively be interposed in the rigging 32 or the suspension wires 14, for example in series or in parallel with damper devices 88. For ease of illustration, springs 90 are shown in FIG. 9 in parallel with damper devices 88, only in the suspension wires 14.

Those skilled in the art will appreciate that similar filtering or isolation provisions such as dampers 88 and/or springs 90 could be added to the second embodiment, for example in the rigging 78 between the buoyancy unit 80 and the frame 64 and/or acting between the frame 64 and the spool 66.

Many other variations are possible within the inventive concept. For example, a spreader frame like that of the first embodiment could omit an on-board ballasting system in favour of wholly external added buoyancy like that applied to the rigid support frame of the second embodiment. Also, a tie-in connection need not be fabricated on land before being transferred into the water: it could instead be fabricated on a vessel floating on or standing in water, such as on the deck of a suitably large fabrication barge.

The invention claimed is:

1. A method of transporting a rigid tie-in connection across a body of water for installation underwater, the method comprising:

supporting the tie-in connection in the water by buoyancy acting on a frame that supports the tie-in connection, which is suspended a distance separate from the buoyancy-supported frame, until installation;

towing the buoyancy-supported frame and the tie-in connection behind a towing vessel in a raised surface-tow configuration towards an installation site, wherein in the surface-tow configuration the combination of the frame and the tie-in connection has negative buoyancy in the water and is supported by external buoyancy;

lowering the buoyancy-supported frame and the tie-in connection from the raised surface-tow configuration into a sub-surface transit configuration; and in the transit configuration, towing the buoyancy-supported frame and the tie-in connection behind the towing vessel toward the installation site.

2. The method of claim 1, wherein the frame has positive buoyancy in the surface-tow configuration imparted by on-board buoyancy, comprising air in a ballast compartment of the frame or at least one buoyancy unit attached to the frame.

3. The method of claim 1, wherein in the surface-tow configuration, an extensible link between the frame and the external buoyancy is held shortened.

4. The method of claim 1, wherein the combination of the frame and the tie-in connection, and any external buoyancy for supporting that combination, is lifted into the water in the surface-tow configuration before being towed by the towing vessel.

5. The method of claim 1, comprising lengthening a link between the frame and external buoyancy from which the frame is suspended, when lowering the frame and the tie-in connection into the transit configuration.

6. The method of claim 5, wherein, in the transit configuration, the external buoyancy remains at the surface of the water.

7. The method of claim 5, wherein, in the transit configuration, the combination of the frame and the tie-in connection has negative buoyancy in the water.

8. The method of claim 1, comprising supporting the frame at least partially by on-board buoyancy and reducing the on-board buoyancy of the frame when lowering the frame and the tie-in connection into the transit configuration.

9. The method of claim 8, wherein on-board buoyancy of the frame is reduced by flooding a compartment of the frame or by detaching at least one buoyancy unit from the frame.

10. The method of claim 1, wherein, at the installation site, the frame and the tie-in connection are suspended from an installation vessel and lowered with negative buoyancy to a seabed location.

11. The method of claim 10, comprising reducing on-board buoyancy of the frame by flooding a compartment of the frame or by detaching at least one buoyancy unit from the frame before lowering the frame and the tie-in connection to the seabed location.

12. The method of claim 11, wherein the frame and the tie-in connection are lowered to the seabed location with external buoyancy remaining attached to the frame, the combination of the frame, the tie-in connection and the external buoyancy then having negative buoyancy.

13. The method of claim 12, wherein the tie-in connection is released from the frame at the seabed location and the combination of the frame and the external buoyancy then has negative buoyancy.

14. The method of claim 10, wherein external buoyancy is detached from the frame before the frame and the tie-in connection are lowered to the seabed location.

15. The method of claim 10, wherein the frame and the tie-in connection are lowered to the seabed location from the sub-surface depth of the transit configuration.

16. The method of claim 10, wherein after the tie-in connection is released from the frame at the seabed location, the installation vessel raises the frame to or near the surface and positive buoyancy is re-established by increasing on-board buoyancy of the frame or by attaching external buoyancy to the frame.

17. The method of claim 16, wherein the frame is supported by external buoyancy and an extensible link between the frame and the external buoyancy is held lengthened to hold the frame below the external buoyancy in a sub-surface transit configuration in which the frame is towed behind a towing vessel.

18. The method of claim 16, wherein the frame is supported by external buoyancy and an extensible link between the frame and the external buoyancy is shortened to lift the frame into a surface-tow configuration in which the frame is towed behind a towing vessel.

19. The method of claim 1, in which, when towing, bollard pull is applied by a towing vessel to the frame or to external buoyancy attached to the frame.

20. The method of claim 1, comprising reducing excitation of the frame and/or the tie-in connection by isolating or damping wave-driven movement of buoyancy.

21. A system for transporting a rigid tie-in connection across a body of water for installation underwater, the system comprising:

a towable frame arranged to support the tie-in connection suspended a distance separate from the towable frame until installation; and external buoyancy attached to the frame by an extensible suspension link arranged to suspend the frame from the buoyancy in water in use, the link being extensible to lower the frame from a raised surface-tow configuration into a lowered sub-surface transit configuration;

wherein the frame further comprises an on-board ballasting system that comprises at least one floodable ballast compartment.

22. The system of claim 21, wherein the external buoyancy is permanently attached to the frame.

23. The system of claim 21, further comprising towing rigging attached to the frame or to the external buoyancy.

24. The system of claim 21, further comprising a rigid tie-in connection supported by the frame.

25. The system of claim 24, wherein the combination of the frame and the tie-in connection is arranged to have negative buoyancy in the water and to be supported by the external buoyancy.

26. The system of claim 25, wherein buoyancy of the frame is adjustable between: a transit state in which the negative buoyancy of the combination is exceeded by positive buoyancy of the external buoyancy; and an installation state in which the negative buoyancy of the combination exceeds the positive buoyancy of the external buoyancy.

27. The system of claim 21, wherein the external buoyancy comprises at least one substantially incompressible buoyant body.

28. The system of claim 21, comprising isolating or damping devices arranged to act between the frame and the tie-in connection or between the frame and the external buoyancy.

29. A system for transporting a rigid tie-in connection across a body of water for installation underwater, the system comprising:

a towable frame arranged to support the tie-in connection suspended a distance separate from the towable frame until installation; and external buoyancy attached to the frame by an extensible suspension link arranged to suspend the frame from the buoyancy in water in use, the link being extensible to lower the frame from a raised surface-tow configuration into a lowered sub-surface transit configuration;

wherein the frame further comprises an on-board ballasting system that comprises at least one buoyancy unit releasably attached to the frame.

30. The system of claim 29, wherein the external buoyancy is permanently attached to the frame.

31. The system of claim 29, further comprising towing rigging attached to the frame or to the external buoyancy.

32. The system of claim 29, further comprising a rigid tie-in connection supported by the frame.

33. The system of claim 32, wherein the combination of the frame and the tie-in connection is arranged to have negative buoyancy in the water and to be supported by the external buoyancy.

34. The system of claim 33, wherein buoyancy of the frame is adjustable between: a transit state in which the negative buoyancy of the combination is exceeded by positive buoyancy of the external buoyancy; and an installation state in which the negative buoyancy of the combination exceeds the positive buoyancy of the external buoyancy.

35. The system of claim 29, wherein the external buoyancy comprises at least one substantially incompressible buoyant body.

36. The system of claim 29, comprising isolating or damping devices arranged to act between the frame and the tie-in connection or between the frame and the external buoyancy.

* * * * *